Dec. 4, 1945.  F. O. HESS  2,390,255
AIRPLANE HEATING MEANS
Filed March 18, 1942  2 Sheets-Sheet 1
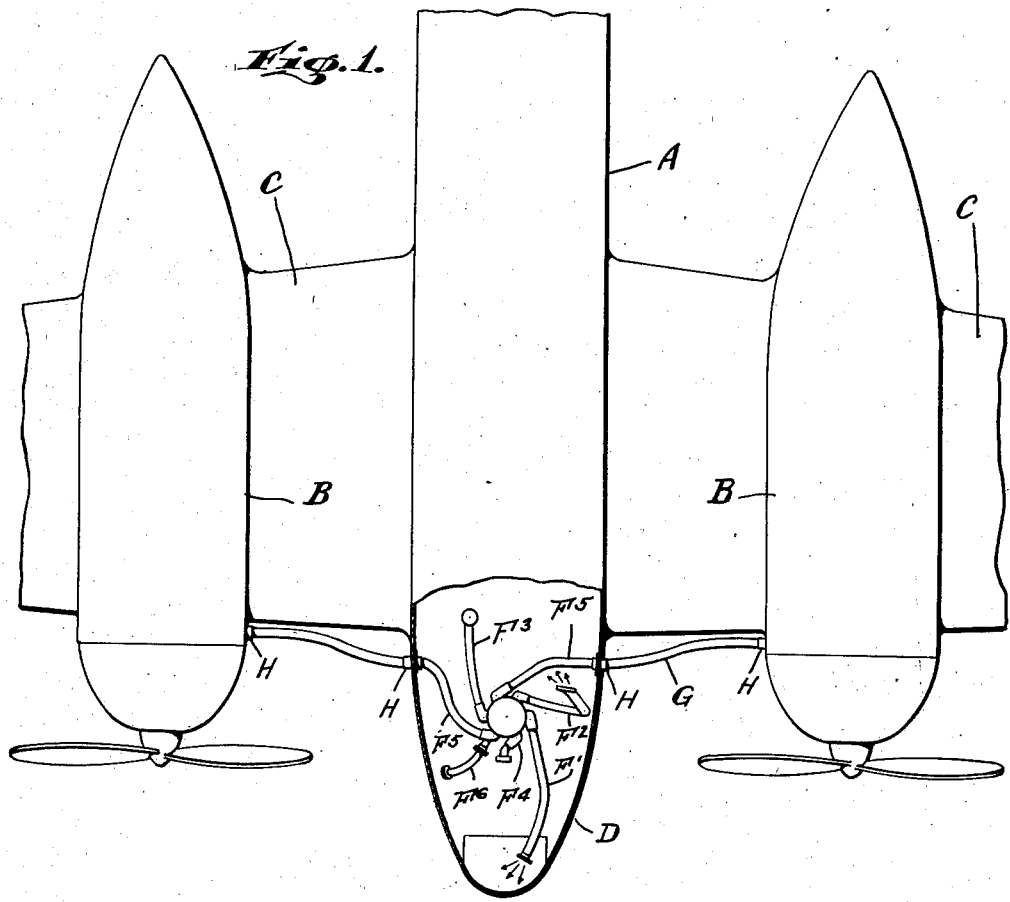
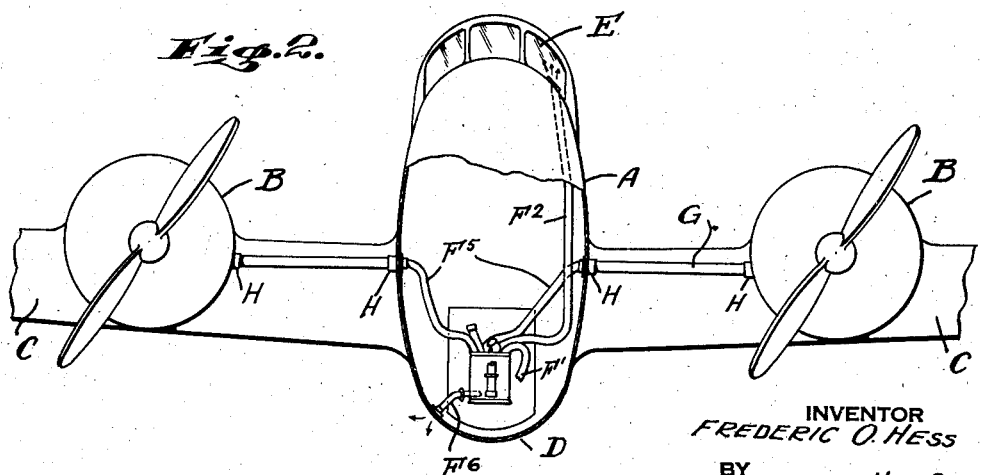
INVENTOR
FREDERIC O. HESS
BY
John E. Hubbell
ATTORNEY Dec. 4, 1945.   F. O. HESS   2,390,255
AIRPLANE HEATING MEANS
Filed March 18, 1942   2 Sheets-Sheet 2
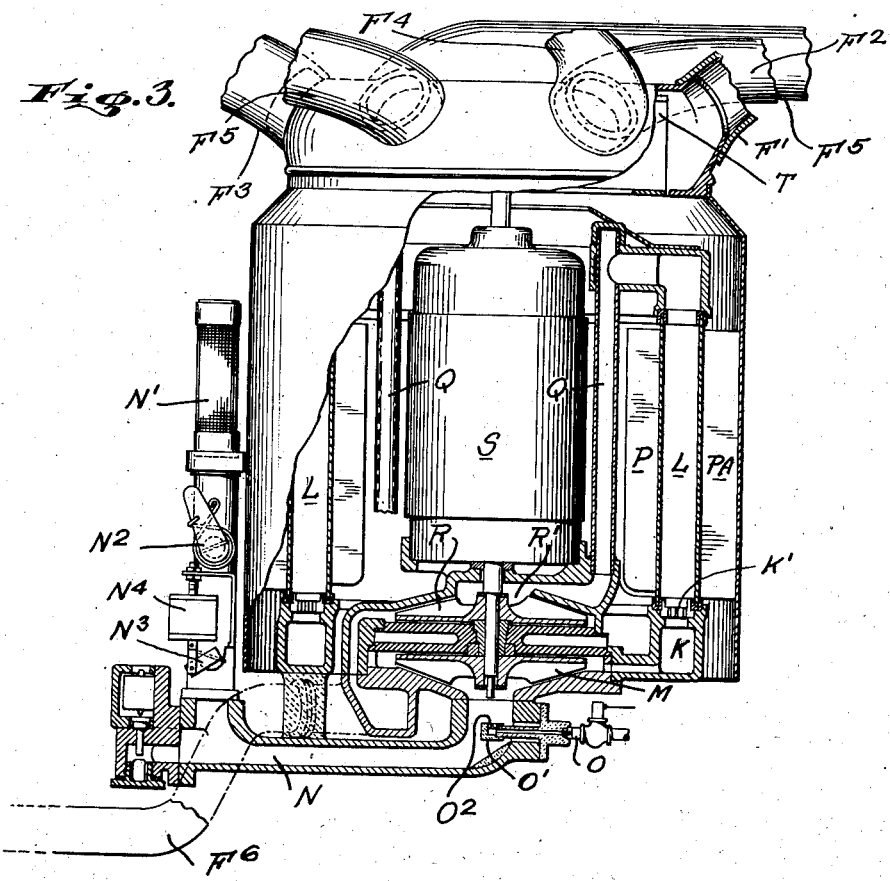
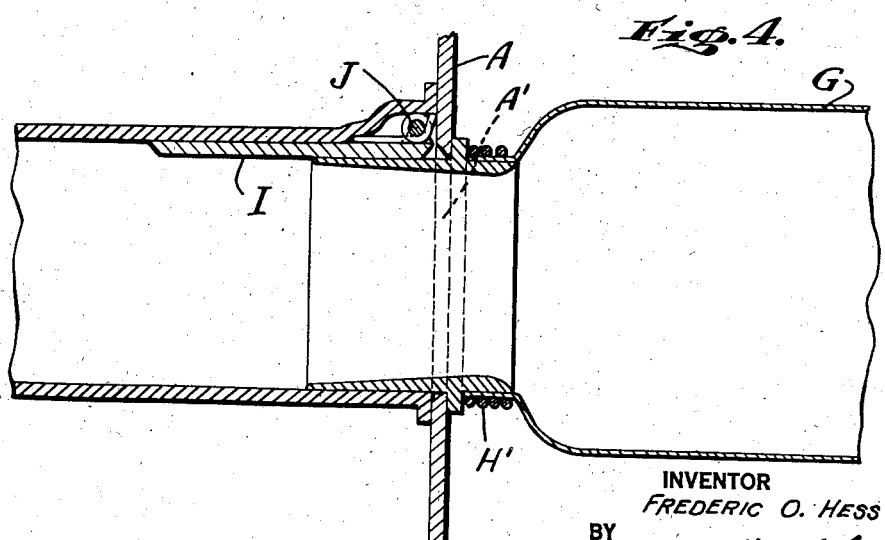
INVENTOR
FREDERIC O. HESS
BY
John E. Hubbell
ATTORNEY Patented Dec. 4, 1945

2,390,255

UNITED STATES PATENT OFFICE 2,390,255

AIRPLANE HEATING MEANS

Frederic O. Hess, Germantown, Pa., assignor to Selas Corporation of America, a corporation of Pennsylvania Application March 18, 1942, Serial No. 435,149

7 Claims. (Cl. 244—118)

The general object of the present invention is to provide an improvement for heating airplanes. More specifically, the object of the invention is to provide simple and effective provisions in which a hot air heater installed in the body or fuselage of an airplane for compartment heating, wind shield defrosting and/or other airplane body heating uses may be employed to heat up the engines of multi-engine airplanes, when said engines, as is now customary, are mounted in nacelles or housing portions of the airplane structure etxernal to the airplane body.

Airplanes, and particularly war planes, adapted for operation at high altitudes, are now being provided with small gasoline burning, hot air heaters including motor fan means for moving the air heated through the heater and delivering it to different portions of the airplanes. It is now customary, also, to provide airplane engine heating facilities at air fields and stations, for heating airplane engines to facilitate starting, and in many cases to continuously maintain airplane engine temperatures high enough to permit them to start quickly into operation whenever occasion arises. Such airplane engine heating provisions customarily comprise a separate portable heater for each airplane engine and provisions for temporarily mounting the heater on the airplane or connecting it to the airplane structure by a flexible hose. Heretofore, so far as I am aware, no attempt has been made to use a heater installed in the body of an airplane in heating an airplane engine external to said body.

I have discovered, however, that it is practically feasible and desirable to combine with a heater installed in the body structure of a multi-engine airplane for airplane body heating purposes, suitable conduit connections comprising readily detachable portions external to the airplane structure so that a gaseous heat conducting medium, such as heated air, for example, may be passed from the heater to the nacelles to warm the airplane engines therein.

In a preferred form of the present invention, each such conduit connection comprises a portion which may be permanently mounted in the body of the airplane and which extends from the heater into register with a valved opening in the side of the airplane body skin or shell, and a detachable conduit portion which in the engine heating operation extends from said opening to an opening in the nacelle surrounding one of the airplane propelling engines and external to the airplane body.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described a preferred embodiment of the invention.

Of the drawings:

Fig. 1 is a diagrammatic plan view of a portion of an airplane;

Fig. 2 is a front elevation of the portion of the airplane shown in Fig. 1;

Fig. 3 is an elevation partly broken away and in section of the heater shown in Figs. 1 and 2; and Fig. 4 is an enlarged section of a portion of the hot air conduit system.

In the drawings A represents the body of a two engine monoplane of conventional design, having an engine nacelle B embodied in each wing C and laterally displaced from the airplane body or fuselage A. The plane shown is designed for military use and comprises a bombardier's wind shield D separate from the pilot's wind shield E. Mounted in the front portion of the body of the airplane is a hot air heater provided with a plurality of hot air outlets. As shown in Fig. 2, a conduit $F^2$ passes hot air from one of the heater outlets into proximity with the pilot's wind shield E to keep the latter free from frost. Similarly, a second heater outlet is connected to a conduit $F^1$ through which hot air is discharged against or in proximity to the bombardier's wind shield D to keep the latter free from frost, as shown in Fig. 1. A third conduit $F^3$ extends from another heater outlet to the pilot's cabin or compartment, and a fourth heat outlet $F^4$ opens directly into the compartment or space occupied by the bombardier.

In the form of the invention shown, two conduits $F^5$ extend from corresponding hot air outlets of the heater to the opposite sides of the airplane body. Each conduit $F^5$ has its end remote from the heater attached to the skin or shell of the airplane body A in register with a coresponding valved opening A' in the skin or shell of the airplane body A. During the engine heating operation a separate detachable conduit G external to the airplane structure is arranged to form an extension of each conduit $F^5$, in communication with the latter through the corresponding opening A' and through which hot air is passed into the engine space within the adjacent nacelle B, the latter being formed for the purpose with a valved opening which may be like the opening A' shown in Fig. 4. Advantageously, each conduit G is provided with an end fitting H at each end adapted to be inserted in any one of the airplane body openings A' and the similar nacelle openings.

Preferably, also, said valved openings and end fittings H are so formed that each conduit G may be operatively connected to and adapted to serve as an extension of a corresponding conduit F⁵ by the mere act of inserting the end fitting H of the conduit in the corresponding opening A' and associated nacelle opening. Thus, as shown in Fig. 4, each opening A' may be normally closed by a disc like door or valve member I connected by a spring hinge J to the airplane body shell at its inner side so that the door I may be turned into the open position shown in Fig. 4, when the corresponding end fitting of the conduit G is inserted in the opening A'. The opening in the nacelle may be normally closed by a spring hinged valve similar to the valve I shown in Fig. 4.

Each duct or conduit G may well consist of canvas body three or four inches or so in diameter with light weight tubular metallic end members H to which the conduit body is secured by a cord H¹ or the like, and when so formed is sufficiently light in weight and small in bulk that it may ordinarily be included in the regular airplane equipment. However, such conduits are relatively inexpensive and easily stored and may well be kept in stock at air fields and stations for interchangeable use by different airplanes taking off from such fields or stations.

The heater located in the fuselage or body A, which is shown most clearly in Fig. 3, is like that disclosed in application Serial No. 450,577 of C. P. Mann and F. O. Hess, filed November 11, 1942. Such a heater comprises a cylindrical casing in the lower portion of which an annular burner K is mounted. The burner K comprises an annular inlet chamber with a top wall K¹ made of ceramic material and formed with orifices extending through it from the interior of the burner K to the combustion space L above the burner, which is of the general type described and claimed in my prior Patent 2,228,114, granted January 7, 1941. Fuel in the form of atomized gasoline and combustion air are supplied to the burner K by a fan M of the turboblower type. The fan M draws the combustion air from the space surrounding the heater through a conduit N which as shown, includes a fire check N', a manually adjustable butterfly valve N² and a second butterfly valve N³ automatically opened and closed by a bellows element N⁴ as the pressure at the inlet to the conduit decreases and increases.

The gasoline is supplied at a suitable pressure, which may be five or six pounds, through a supply pipe O which terminates in a discharge nozzle O' having a restricted orifice O² through which the gasoline is discharged in jet form against an inner portion of the impeller of the fan M which thus serves as a mechanical atomizer.

The combustion chamber L is annular in form and has inner and outer annular sheet metal walls provided with fins or ribs extending into the combustion chamber L and also into the annular air passages P and PA at the inner and outer sides of the combustion chamber L. Products of combustion formed in the combustion chamber L pass from the latter into downwardly extending tubes Q which open into the inlet chamber R' of a fan R of the turboblower type which is concentric with and above the fan M. The products of combustion pass away from the heater to the external atmosphere through an outlet connection F⁶. The fans M and R are both connected to the lower end portion of the shaft of an electric motor S preferably a series motor which is centrally disposed in the heater unit. A circulating fan T carried by the upper end of the armature shaft of the motor S draws air into the air channels P and PA at their lower ends, and discharges it through the fan outlet chamber from which the previously mentioned heater outlets open.

While in accordance with the provisions of the statutes, I have illustrated and described the best form of embodiment of my invention now known to me, it will be apparent to those skilled in the art that changes may be made in the form of the apparatus disclosed without departing from the spirit of my invention, as set forth in the appended claims.

Having now described my invention, what I claim as new and desire to secure by Letters Patent is:

1. A method of warming the engines of a multi-engined airplane having a fuselage and a nacelle displaced laterally from the fuselage for housing a propeller engine, which comprises heating a gaseous heat conducting medium in the fuselage independently of the engines, flowing the heated gaseous heat conducting medium from the interior of the fuselage to the interior of the nacelle through a conduit exteriorly of the airplane to warm the engine in the nacelle when the airplane is grounded, and disconnecting the conduit exteriorly of the airplane before flight of the airplane is effected.

2. A method of warming the engines of a multi-engined airplane in which all of the engines are housed in nacelles displaced laterally from the body or fuselage of the airplane, which comprises heating a gaseous heat conducting medium in the fuselage independently of the engines, flowing the heated gaseous heat conducting medium from the interior of the fuselage to the interior of the nacelles through conduit means exteriorly of the airplane to warm the engines in the nacelles when the airplane is grounded, and disconnecting the conduit means exteriorly of the airplane before flight of the airplane is effected.

3. The combination with a multi-engined airplane structure having a fuselage or body and a nacelle displaced laterally from the body for housing a propeller engine therein, said nacelle having an opening therein, of an air heater in the body which is operable independently of the engines, means providing a passage for heated air which extends from the heater to a side wall of the body, and means including a conduit external to the airplane structure adapted to be detachably connected at one end to the side wall of the body to communicate with said passage and to be detachably connected at its other end to the opening in said nacelle for conducting heated air from the body to the nacelle to warm the engine therein when the airplane structure is grounded, said conduit being unsuitable as a permanently connected part of the airplane structure when in flight.

4. The combination with a multi-engined airplane structure having a fuselage or body and a nacelle displaced laterally from the body for housing a propeller engine therein, said nacelle having an opening therein, of an air heater in the body which is operable independently of the engines, means providing a passage for heated air which extends from the heater to a side wall of the body, conduit means external to the airplane structure adapted to be detachably connected at one end to the side wall of the body to communicate with said passage and to be detachably connected at its other end to the opening in said nacelle for conducting heated air from the body to the nacelle to warm the engine therein when the airplane structure is grounded, and means associated with said heater for circulating air to be heated therethrough and causing such heated air to flow through said passage and conduit means, said conduit means being unsuitable as a permanently connected part of the airplane structure when in flight.

5. The combination with a multi-engined airplane structure having a fusealge or body and a nacelle displaced laterally from the body for housing a propeller engine therein, said nacelle having an opening therein, of an air heater in the body which is operable independently of the engines, the body having an opening in a side wall thereof, means providing a passage for heated air which extends from the heater to the opening in the body, conduit means external to the airplane structure adapted to be detachably connected at one end to the body at the opening therein and to be detachably connected at its other end to the opening in the nacelle for conducting heated air from the body to the nacelle to warm the engine therein when the airplane structure is grounded, said conduit means being unsuitable as a permanently connected part of the airplane structure when in flight, and valve means associated with the passage adapted to be closed during flight of the airplane structure and opened when said conduit means is detachably connected thereto.

6. The combination with a multi-engined airplane structure having a fuselage or body and a nacelle displaced laterally from the body for housing a propeller engine therein, said nacelle having an opening therein, of an air heater in the body which is operable independently of the engines, an opening in a side wall of the body, means providing a passage for heated air which extends from the heater to the opening in the body, valve means at the opening in the body movable between open and closed positions, and means including a conduit external to the airplane structure adapted to be detachably connected at one end to the body at the opening therein and to be detachably connected at its other end to the opening in the nacelle for conducting heated air from the body past said valve means to the nacelle to warm the engine therein when the airplane structure is grounded, said conduit being unsuitable as a permanently connected part of the airplane structure when in flight.

7. The combination with a multi-engined airplane structure having a fuselage or body and nacelles displaced laterally from each side of the body for housing propeller engines therein, said nacelles each having an opening therein, of air heating means in the body operable independently of the engines, means providing passages for heated air which extend from the heating means to the side of the body, and conduit means external to the airplane structure adapted to be detachably connected at one end to the body at the regions of the side walls at which said passages terminate and to be detachably connected at the opposite end to the openings in the nacelles for conducting heated air from the body to the nacelles to warm the engines therein when the airplane structure is grounded, said conduit means being unsuitable as a permanently connected part of the airplane structure when in flight.

FREDERIC O. HESS.